(12) United States Patent
Mukherjee

(10) Patent No.: US 7,620,252 B2
(45) Date of Patent: Nov. 17, 2009

(54) SYSTEM AND METHOD FOR COMPRESSING AN IMAGE

(75) Inventor: Debargha Mukherjee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 826 days.

(21) Appl. No.: 11/113,250

(22) Filed: Apr. 22, 2005

(65) Prior Publication Data

US 2006/0239576 A1    Oct. 26, 2006

(51) Int. Cl.
*G06K 9/36* (2006.01)
*G06K 9/46* (2006.01)

(52) U.S. Cl. ................... 382/232; 382/245

(58) Field of Classification Search ............ 382/232, 382/245
See application file for complete search history.

(56) References Cited

U.S. PATENT DOCUMENTS 5,684,536 A * 11/1997 Sugiyama et al. ........ 375/240.2
6,577,681 B1 * 6/2003 Kimura .................... 375/240.2
2003/0081845 A1   5/2003 Mukherjee et al.

OTHER PUBLICATIONS

Lakhani, A modification to the Huffman coding of JPEG's baseline compression algorithm, 2000, Data Compression Conference, 2000. p. 1.*
Mukherjee, D. et al., "Low Complexity Guaranteed Fit Compound Document Compression", Compression and Multimedia Technologies Group, Hewlett Packard Laboratories, CA, 2002.

* cited by examiner

*Primary Examiner*—John B Strege

(57) ABSTRACT

In a method for compressing an image, a number of non-zero AC coefficients for a component transform and the locations of the non-zero AC coefficients in a transform block are determined. One of a plurality of coding modes is selected in response to the number of non-zero AC coefficients and the locations of the non-zero AC coefficients satisfying predetermined criteria, where the plurality of coding modes comprise different bit allocations from each other. In addition, the locations and values of the non-zero AC coefficients and a DC coefficient for the component transform are coded according to the selected coding mode, to thereby compress the image.

30 Claims, 6 Drawing Sheets

SYSTEM AND METHOD FOR COMPRESSING AN IMAGE

BACKGROUND

In many applications, data compression is used to reduce the amount data required to represent an image. Data compression is the re-encoding of data in a more compact form. If the compressed data can be expanded to replicate the original (uncompressed) data, the compression is said to be "lossless". If this is not possible, the compression is said to be lossy. While lossless compression is preferable in principle, lossy compression can often achieve dramatically greater reductions in data. In the case of some images, dramatic reductions in data can be achieved using lossy compression with no perceptible loss of image quality. In other cases, even more dramatic reductions can be achieved with acceptable compromises in image quality.

In some applications, such as certain laser printing applications, there is insufficient memory to store a full-size uncompressed image. In such applications, the image must be compressed so that the entire compressed image fits within a predetermined memory size. There are, however, significant costs that can be incurred in using these compression techniques. For example, there can be substantial system overhead and time required to perform the compression and decompression operations.

It would therefore be desirable to have a relatively simple and inexpensive technique for compressing data.

SUMMARY

A method for compressing an image is disclosed herein. In the method, a number of non-zero AC coefficients for a component transform and the locations of the non-zero AC coefficients in a transform block are determined. One of a plurality of coding modes is selected in response to the number of non-zero AC coefficients and the locations of the non-zero AC coefficients satisfying predetermined criteria, where the plurality of coding modes comprise different bit allocations from each other. In addition, the locations and values of the non-zero AC coefficients and a DC coefficient for the component transform are coded according to the selected coding mode, to thereby compress the image.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed in greater detail herein below is a system and method for compressing an image in a relatively efficient and simple manner. The system and method disclosed herein generally enable the use of a 4×4 transform that approximates the characteristics of a 4×4 DCT and may be implemented through bit-shifts and additions. In addition, the quantization may be performed through use of bit-shifts only, such that, there are no multiplication or divisions needed in the entire encoding or decoding process. Moreover, because the transform disclosed below is near-orthogonal, the transform performs relatively better de-correlation, and complications in compensating for differences in coefficient energies during the quantization process are reduced or eliminated. Furthermore, the system and method disclosed herein may guarantee a minimum compression ratio, which is relatively difficult to guarantee in conventional systems because conventional systems typically use the same coding scheme for each block of an image.

Figure 1:
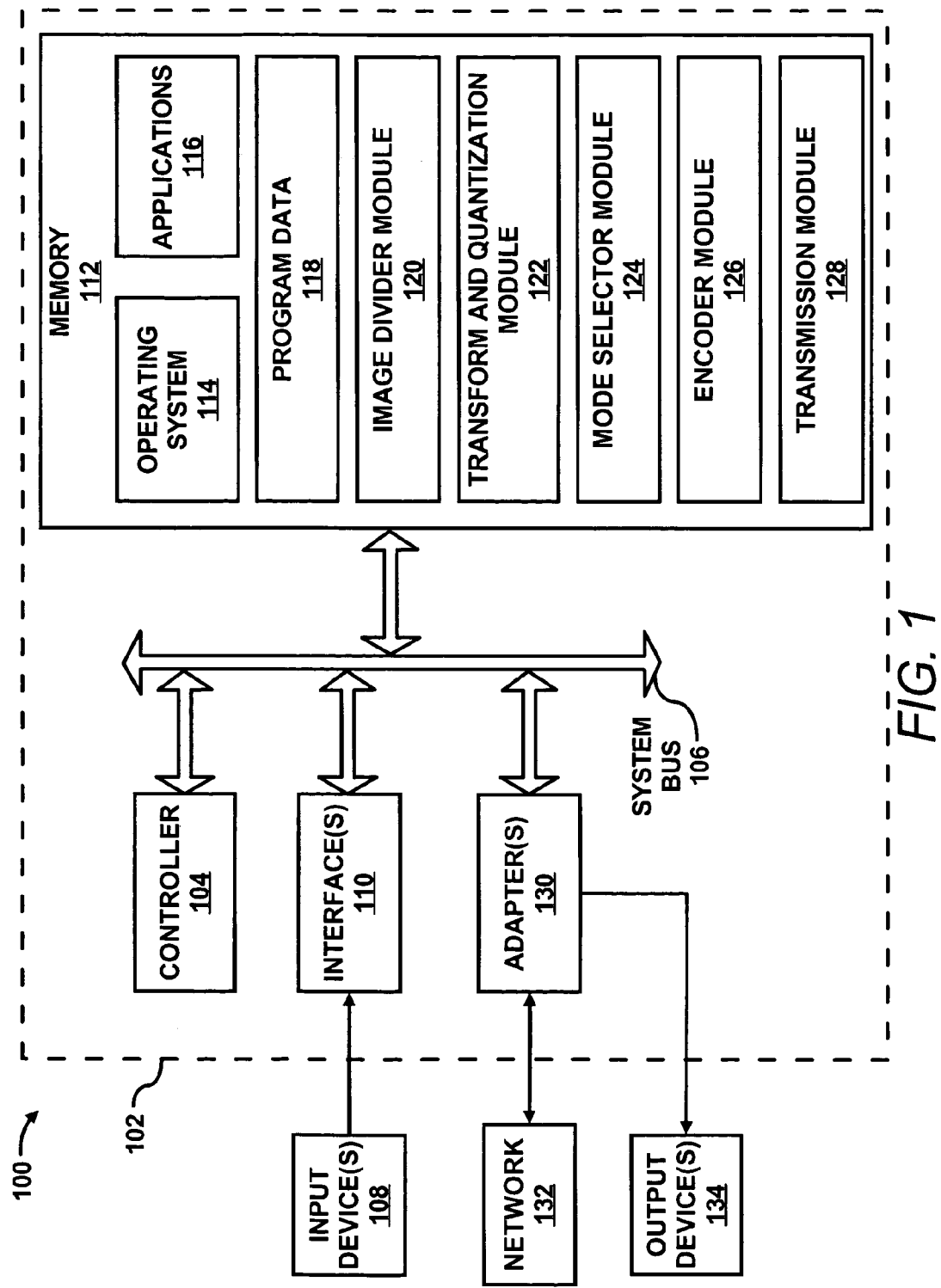
FIG. 1 shows a block diagram of an image compression system suitable for implementing, either fully or partially, various image compression techniques, according to an embodiment of the invention.

With reference first to FIG. 1, there is shown a block diagram 100 of an image compression system 102 suitable for implementing, either fully or partially, various image compression techniques described herein. More particularly, the image compression system 102 may be implemented to perform some or all of the steps outlined in the method 200 depicted in FIG. 2 below. It should be understood that the following description of the block diagram 100 is but one manner of a variety of different manners in which such an image compression system 102 may be configured or operated.

In addition, it should be understood that the image compression system 102 may include additional components and that some of the components described may be removed and/or modified without departing from a scope of the image compression system 102. Although the image compression system 102 is depicted as comprising a computing device, various functions of the image compression system 102 may be performed by various software and/or hardware contained in a computing device, such as a computer, a printer, and the like. However, the following description of the image compression system 102 is set forth with the image compression system 102 comprising a computing device for purposes of simplicity.

The image compression system 102 may comprise a general computing environment and includes a controller 104 configured to control various operations of the image compression system 102. The controller 104 may comprise a microprocessor, a micro-controller, an application specific integrated circuit (ASIC), and the like. Data may be transmitted to various components of the image compression system 102 over a system bus 106 that operates to couple the various components of the image compression system 102. The system bus 106 represents any of several types of bus structures, including, for instance, a memory bus, a memory controller, a peripheral bus, an accelerated graphics port, a processor bus using any of a variety of bus architectures, and the like. In addition, the image compression system 102 may be embedded, for instance, in a color laser printer.

One or more input devices 108 may be employed to input information into the image compression system 102. The input devices 108 may comprise, for instance, a host computer, a keyboard, a mouse, a scanner, a disk drive, removable media, flash drives, and the like. The input devices 108 may be used, for instance, to input images, frames of images or representations of the images (that is, the images in code format, which is referred to herein after as an "image" for purposes of simplicity) to the image compression system 102. The input devices 108 are connected to the controller 104 through an interface 110 that is coupled to the system bus 106. The input devices 108 may, however, be coupled by other conventional interface and bus structures, such as, parallel ports, USB ports, etc.

The controller 104 may be connected to a memory 112 through the system bus 106. Generally speaking, the memory 112 may be configured to provide storage of software, algorithms, and the like, that provide the functionality of the image compression system 102. By way of example, the memory 112 may store an operating system 114, application programs 116, program data 118, and the like. In this regard, the memory 112 may be implemented as a combination of volatile and non-volatile memory, such as DRAM, EEPROM, MRAM, flash memory, and the like. In addition, or alternatively, the memory 112 may comprise a device configured to read from and write to a removable media, such as, a floppy disk, a CD-ROM, a DVD-ROM, or other optical or magnetic media.

The memory 112 may also store modules programmed to perform various functions in compressing images. More particularly, the memory 112 may store an image divider module 120, a transform and quantization module 122, a mode selector module 124, an encoder module 126, and a transmission module 128. In addition, the controller 104 may be configured to implement the modules 120-128 stored in the memory 112 as described in greater detail herein below.

The controller 104 is configured to implement the image divider module 120 to divide a source image 302 (FIG. 3) into a number of blocks 306, and to further divide the blocks 306 into a plurality of sub-blocks 308 containing a plurality of components 310. The controller 104 may implement the transform and quantization module 122 to compute transforms for each of the components 310 of the sub-blocks 308. The controller 104 may additionally implement the transform and quantization module 122 to quantize the coefficients of the transform blocks for each available coding mode as described in greater detail herein below.

The controller 104 is configured to implement the mode selector module 124 to select one of a plurality of coding modes to be used for each of the plurality of components 310. For instance, the plurality of coding modes may include the six (6) coding modes described in greater detail below. The plurality of coding modes may additionally include other coding modes, such as, block truncation coding, vector quantization coding, JPEG coding, etc. The controller 104 may implement the mode selector module 124 to choose one of the six (6) coding modes described below to use based upon the number of non-zero AC coefficients for the component transforms and their locations. More particularly, the mode selector module 124 may be implemented to choose the coding mode based upon the satisfaction of certain criteria. The criteria is based upon the number of non-zero AC coefficients present for the transform blocks and locations of the AC coefficients. In certain instances, if none of the certain criteria described below are satisfied, the mode selector module 124 may select one of the other coding modes, such as, block truncation coding, vector quantization coding, JPEG coding, etc.

The controller 104 is configured to implement the encoder module 126 to assign bit allocations to the DC and AC coefficients of the transform blocks according to the coding mode chosen by the mode selector module 124. The controller 104 may implement the encoder module 126 to assign bits to the DC and AC coefficients such that the total number of bits assigned varies according to the selected coding mode. By way of example, a first one of the coding modes may be allocated a total of twenty-four (24) bits, whereas a sixth one of the coding modes may be allocated sixteen (16) bits. The controller 104 may also implement the encoder module 126 to decompress a compressed image by decoding the bit allocations to the DC and AC coefficients of the transform blocks according to the coding mode chosen in compressing the image.

The controller 104 may implement the transmission module 128 to send the DC and AC coefficients, including their magnitudes and signs, using the bit allocation schedule for the selected coding mode. The controller 104 may also implement the transmission module 128 to send information pertaining to the locations of the DC and AC coefficients. In general, the number of bits required to identify the locations of AC coefficients may be derived from the selected coding mode because coding mode indicates whether the AC coefficients are zero or not. For instance, and as described in greater detail herein below, the location information for the first and second coding modes require eight (8) bits, the location information for the third and fourth coding modes require four (4) bits, the location information for the fifth coding mode requires one (1) bit, and the location information for the sixth coding mode does not require any bits. Thus, for instance, the first one of the coding modes may require a total of thirty-two (32) bits (or four (4) bytes) per component 310 per sub-block 308; whereas, the sixth one of the coding modes may require a total of sixteen (16) bits (or two (2) bytes) per component 310 per sub-block 308.

The controller 104 may thus compress individual components 310 of the source image 302 in particular and the entire source image 302 as a whole, thereby reducing the amount of space required to store the source image 302. The image compression system 102 may, in one respect, be employed in a printer (not shown) to, for instance, compress and store images for printing.

In addition, or alternatively, the location information and the DC and AC coefficient information may be sent outside of the image compression system 102 through one or more adapters 130. In a first example, the location information and the DC and AC coefficient information may be transmitted to a network 132, such as, an internal network, an external network (the Internet), etc. In a second example, the image data may be outputted to one or more output devices 134, such as, displays, printers, facsimile machines, etc.

Figure 2A:
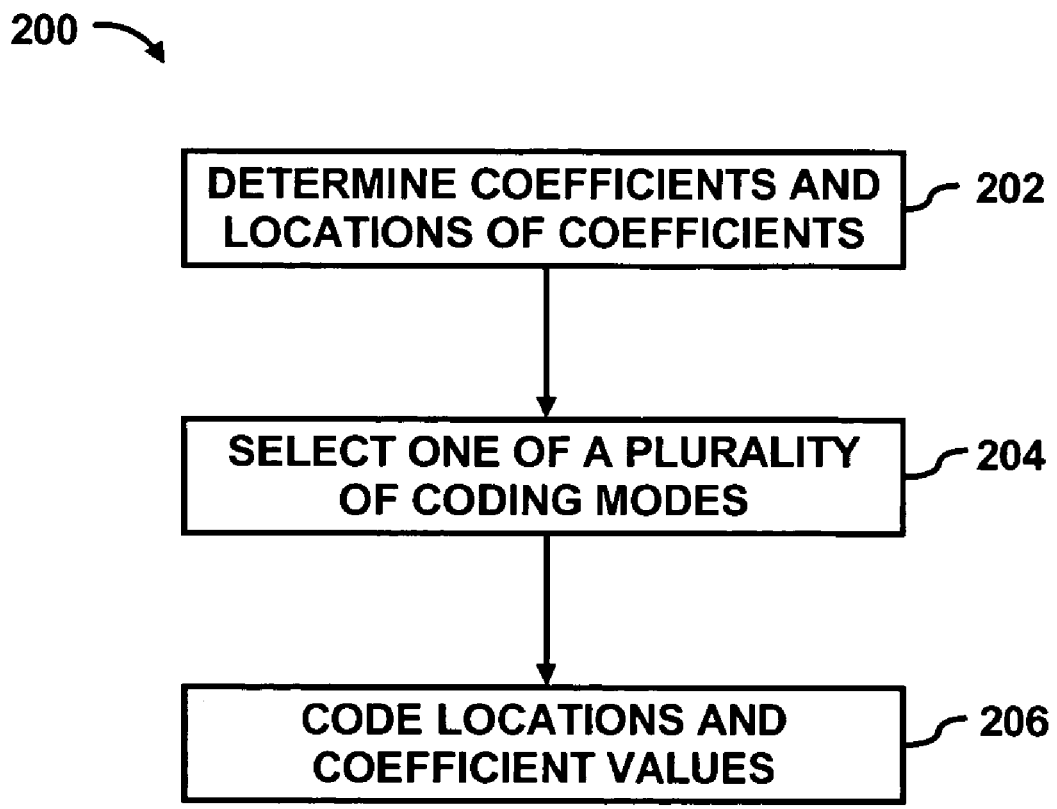
FIG. 2A illustrates a flow diagram of a method for compressing an image, according to an embodiment of the invention.

With reference to FIG. 2A, there is shown a flow diagram of a method 200 for compressing an image. It is to be understood that the following description of the method 200 is but one manner of a variety of different manners in which an image may be compressed. It should also be apparent to those of ordinary skill in the art that the method 200 represents a generalized illustration and that other steps may be added or existing steps may be removed or modified without departing from a scope of the method 200. The description of the method 200 is made with reference to the block diagram 100 illustrated in FIG. 1, and thus makes reference to the elements cited therein. It should, however, be understood that the method 200 shown in FIG. 2A is not limited to implementation by the elements shown in FIG. 1 and may thus be implemented by more, less, or different elements as those shown in FIG. 1.

In the method 200, a number of non-zero AC coefficients for a component transform and the locations of the non-zero AC coefficients in a transform block are determined at step 202. In addition, one of a plurality of coding modes is selected in response to the number of non-zero AC coefficients and the locations of the non-zero AC coefficients satisfying predetermined criteria, where the plurality of coding modes comprise different bit allocations from each other, at step 204. At step 206, the locations and values of the non-zero AC coefficients and a DC coefficient for the component transform are coded according to the selected coding mode, to thereby compress the image.

The method 200 provides a relatively high level description of a technique for image compression disclosed herein. The following method 250 in FIG. 2B provides a relatively more detailed description of the image compression techniques disclosed herein.

Figure 2B:
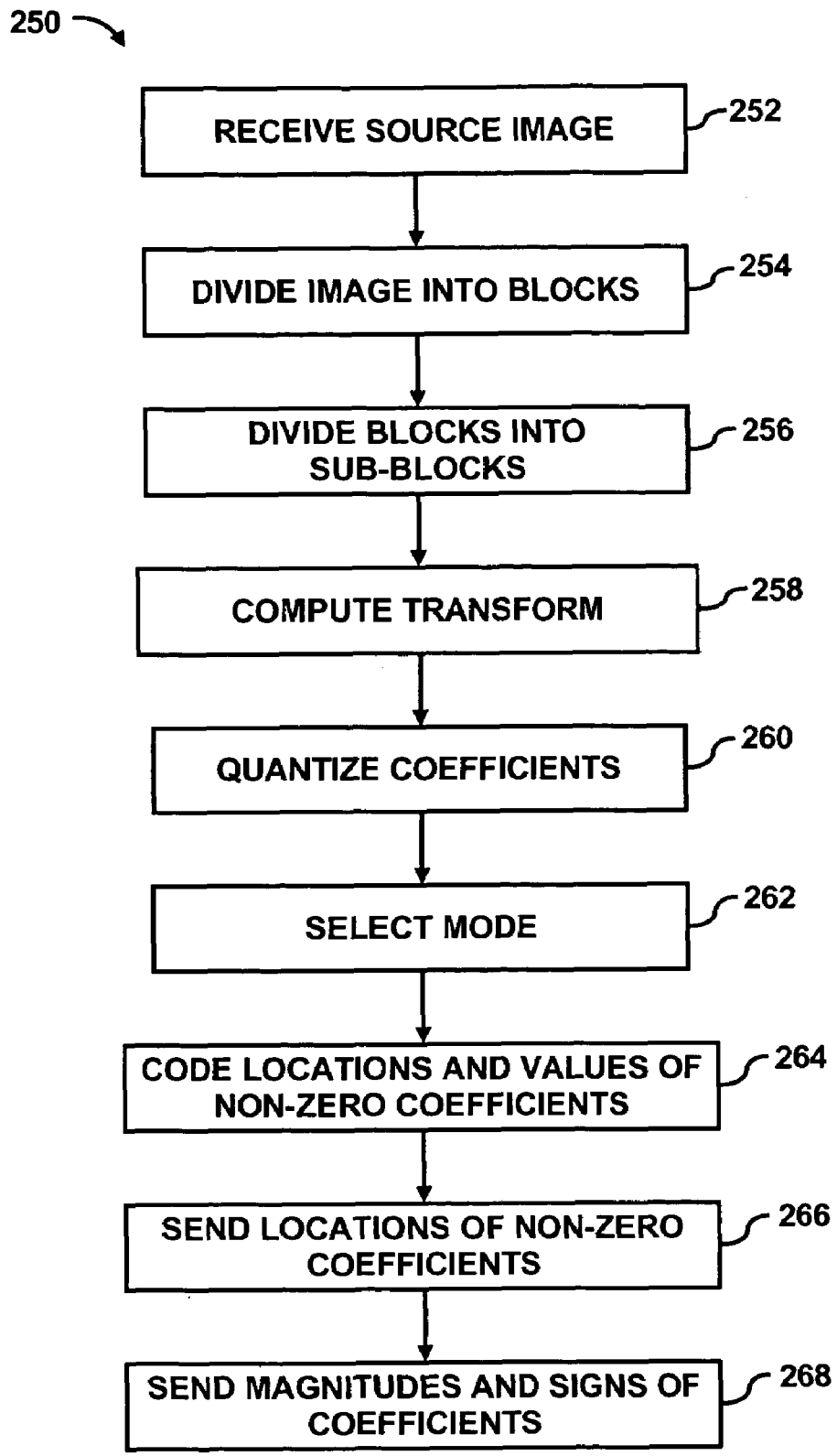
FIG. 2B illustrates a flow diagram of a method for compressing an image, which depicts in greater detail, the method shown in FIG. 2A, according to an embodiment of the invention.

More particularly, FIG. 2B depicts a flow diagram of a method 250 for compressing an image. It is to be understood that the following description of the method 250 is but one manner of a variety of different manners in which an image may be compressed. It should also be apparent to those of ordinary skill in the art that the method 250 represents a generalized illustration and that other steps may be added or existing steps may be removed or modified without departing from a scope of the method 250. The description of the method 250 is made with reference to the block diagram 100 illustrated in FIG. 1, and thus makes reference to the elements cited therein. It should, however, be understood that the method 200 shown in FIG. 2A is not limited to implementation by the elements shown in FIG. 1 and may thus be implemented by more, less, or different elements as those shown in FIG. 1.

The method 250 may be implemented as one mode in a multi-mode framework. As such, the method 250 is capable of guaranteeing compressions of nearly 4:1 in this mode. In addition, higher compression ratios may be achieved through use of other modes in the multi-mode framework. An example of a suitable multi-mode framework in which the method 250 may be implemented as one mode is disclosed in co-pending and commonly assigned, U.S. Patent Application Publication No. 2003/0081845, published on May 1, 2003, and entitled "SINGLE-PASS GUARANTEED-FIT DATA COMPRESSION USING RATE FEEDBACK". The disclosure contained in that patent publication is hereby incorporated by reference in its entirety.

The method 250 may be initiated automatically through receipt of a source image 302 (FIG. 3) to be compressed at step 252. In addition, or alternatively, the method 250 may be initiated following a set period of time, another operation, or the method 250 may be manually initiated.

Figure 3:
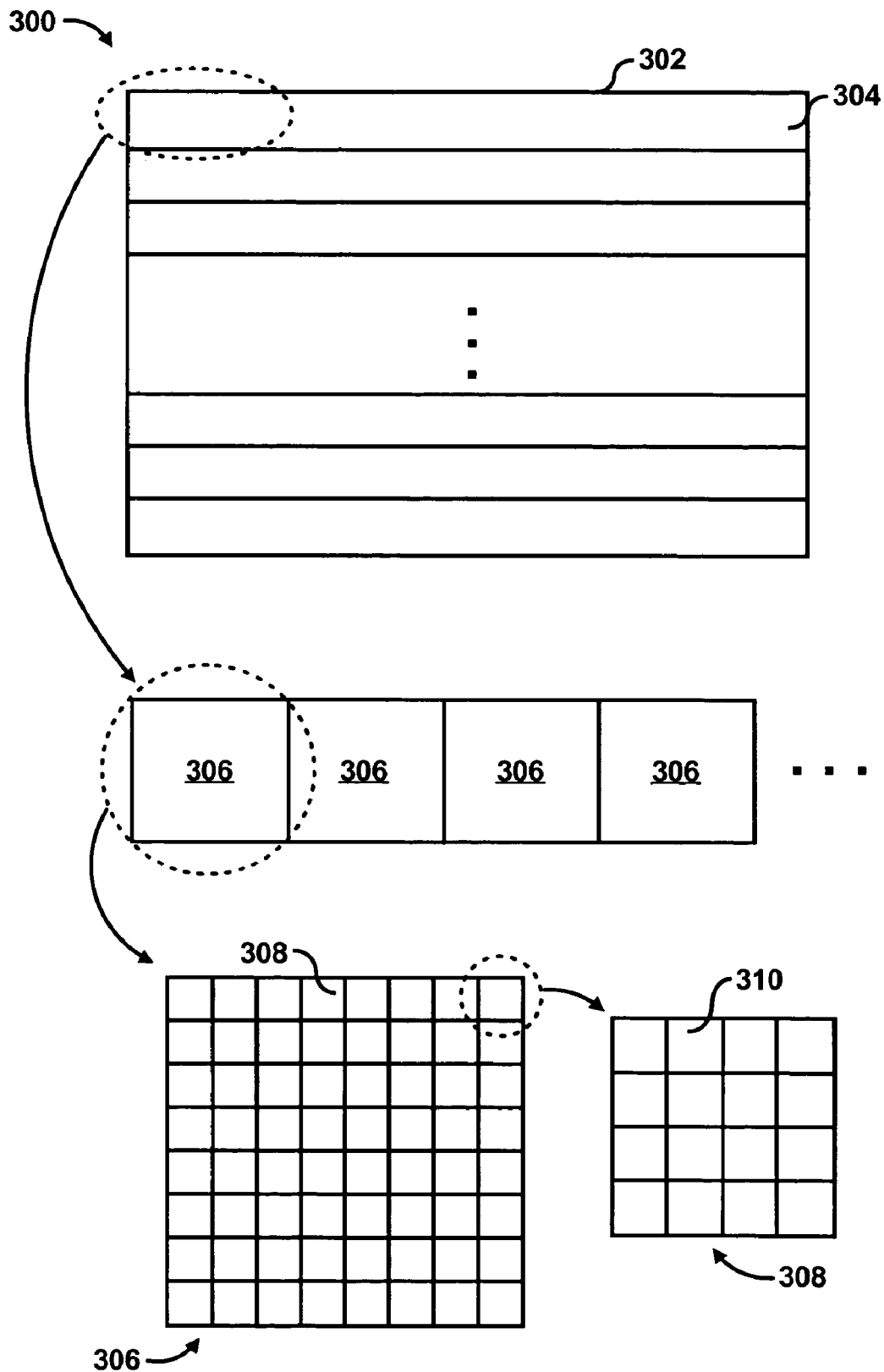
FIG. 3 illustrates a schematic diagram of an image divided into a plurality of components, according to an embodiment of the invention.

Once initiated, at step 254, the source image may be divided into a number of blocks 306 as depicted in the diagram 300 (FIG. 3). The diagram 300, more particularly, schematically illustrates various components of the source image 302. As shown in FIG. 3, the source image 302 includes a series of strips 304 and each strip includes a series of blocks 306. Each of the blocks 306 may be divided into a number of sub-blocks 308 at step 254. In addition, each of the sub-blocks 308 may be divided into a number of components 310 at step 256.

As shown in FIG. 3, each of the blocks 306 includes an array of 8×8 sub-blocks 308 and each of the sub-blocks 308 includes an array of 4×4 components 310. It should, however, be understood that the source image 302 may be divided into arrays of sub-blocks 308 and components 310 having different values without deviating from a scope of the method 200.

For each of the sub-blocks 308, the 4×4 transforms for each component 310 is computed separately, as indicated at step 258. More particularly, at step 208, the row transforms are computed first, followed by the column transforms. In addition, the transform matrix T is:

Equation (1):

$$T = \begin{bmatrix} 0.5 & 0.5 & 0.5 & 0.5 \\ 0.65625 & 0.265625 & -0.265625 & -0.65625 \\ 0.5 & -0.5 & -0.5 & 0.5 \\ 0.265625 & -0.65625 & 0.65625 & -0.265625 \end{bmatrix}.$$

As shown in Equation (1), the coefficients have been chosen such that an implementation with only bit-shifts and additions is possible with 32-bit arithmetic. In addition, the transform is near-orthogonal, to thereby reduce or eliminate complications in compensating for the difference in energies of different coefficients during the following quantization process.

The inverse transform may be computed by scaling the second and fourth coefficients by $1/1.00244140625$, which equals 0.997564539698, and then by computing a transform using the transpose of the transform matrix (T) above in Equation (1). That is:

Equation (2):

$$T^{-1} = \begin{bmatrix} 0.5 & 0.65625 & 0.5 & 0.265625 \\ 0.5 & 0.265625 & -0.5 & -0.65625 \\ 0.5 & -0.265625 & -0.5 & 0.65625 \\ 0.5 & -0.65625 & 0.5 & -0.265625 \end{bmatrix}$$

$$\begin{bmatrix} 1 & 0 & 0 & 0 \\ 0 & 0.997564539698 & 0 & 0 \\ 0 & 0 & 1 & 0 \\ 0 & 0 & 0 & 0.997564539698 \end{bmatrix}.$$

While the transformation with the T transpose may be computed using only bit-shifts and additions, multiplications are still needed for the scaling operation to obtain an exact inverse. However, two approximate inverses may be computed that enable a multiplication free inversion. First, 0.99756453969800 may be approximated by $1\tfrac{1}{512}=0.998046875$ which allows a computation using only bit-shifts and additions. Second, the scaling operation may simply be ignored because it is sufficiently close to 1.

At step 260, the coefficients of the transform matrix T may be quantized by dividing a 4×4 quantization matrix and rounding to the nearest integer, for each available coding mode. The quantization matrices may comprise powers of 2, to thereby enable computation of divisions by bit-shifts. In addition, the quantization matrix may differ for each available coding mode. However, the quantization matrices for each coding mode are typically scaled versions of a baseline quantization matrix with the scale factor being a power of 2. In one example, there are two quantization modes ($Q_0, Q_1$), with the following quantization matrices:

Equation (3):

$$Q_0 = \begin{bmatrix} 8 & 16 & 32 & 32 \\ 16 & 32 & 32 & 32 \\ 32 & 32 & 32 & 32 \\ 32 & 32 & 32 & 32 \end{bmatrix}; \text{ and}$$

Equation (4):

$$Q_1 = 2 \times \begin{bmatrix} 8 & 16 & 32 & 32 \\ 16 & 32 & 32 & 32 \\ 32 & 32 & 32 & 32 \\ 32 & 32 & 32 & 32 \end{bmatrix}.$$

The coding mode to use for each sub-block 308 may be selected at step 262. The selected coding mode may comprise one of the six (6) coding modes described below if the conditions, also described below, are satisfied. In addition, selection of one of the six (6) coding modes described below to use is based upon the number of non-zero AC coefficients for the component transforms and their locations. More particularly, one of the six (6) coding modes described below may be selected based upon the satisfaction of certain criteria. The criteria are based upon the number of non-zero AC coefficients present for the transform blocks and locations of the AC coefficients.

The plurality of coding modes, however, may additionally include other coding modes, such as, block truncation coding, vector quantization coding, JPEG coding, etc. In this regard, one or more of these additional coding modes may be selected at step 262 if it is determined that the conditions for any of the six (6) coding modes described below are not satisfied.

The six (6) coding modes may be selected at step 262 according to the number of non-zero AC coefficients for the sub-block 308 transforms and the locations of the non-zero AC coefficients. More particularly, for a coding mode to be used for a sub-block 308, the number of non-zero AC coefficients for the transform blocks and the locations of the non-zero AC coefficients must satisfy certain criteria as described in greater detail herein below. Should a number of coding modes satisfy the corresponding criteria, the first of the coding modes may be selected that have the finest level of quantization and among the coding modes having the finest level quantization, the fewest number of bits to code.

To qualify for the first coding mode, all of the transform blocks in the sub-block 308 must contain no greater than three (3) non-zero AC coefficients on quantization with $Q_0$ (Equation (3)). In addition, none of the non-zero coefficients should be in the lower, right 6-coefficient triangle (shown by "*" below) depicted below with respect to Transform Block A. To qualify for the second coding mode, all of the transform blocks in the sub-block 308 must contain no greater than four (4) non-zero AC coefficients on quantization with $Q_1$ (Equation (4)). In addition, none of the non-zero coefficients should be in the lower, right 6-coefficient triangle (shown by "*" below) depicted below with respect to Transform Block A.

Transform Block A:

$$\begin{bmatrix} dc & ac & ac & ac \\ ac & ac & ac & * \\ ac & ac & * & * \\ ac & * & * & * \end{bmatrix}.$$

To qualify for the third coding mode, all of the transform blocks in the sub-block 308 must contain no greater than two (2) non-zero AC coefficients on quantization with $Q_0$. In addition, none of the non-zero coefficients should be in the lower, right 10-coefficient triangle (shown by "+" below) depicted below with respect to Transform Block B. To qualify for the fourth coding mode, all of the transform blocks in the sub-block 308 must contain no greater than three (3) non-zero AC coefficients on quantization with $Q_1$. In addition, none of the non-zero coefficients should be in the lower, right 10-coefficient triangle (shown by "+" below) depicted with respect to Transform Block B.

Transform Block B:

$$\begin{bmatrix} dc & ac & ac & + \\ ac & ac & + & + \\ ac & + & + & + \\ + & + & + & + \end{bmatrix}.$$

To qualify for the fifth coding mode, all of the transform blocks in the sub-block 308 must contain no greater than one (1) non-zero AC coefficients on quantization with $Q_0$. In addition, none of the non-zero coefficients should be among the coefficients shown by "$" below with respect to Transform Block C. To qualify for the sixth coding mode, all of the transform blocks in the sub-block 308 must contain no greater than two (2) non-zero AC coefficients on quantization with $Q_1$. In addition, none of the non-zero coefficients should be among the coefficients shown by "$" below with respect to Transform Block C.

Transform Block C:

$$\begin{bmatrix} dc & ac & \$ & \$ \\ ac & \$ & \$ & \$ \\ \$ & \$ & \$ & \$ \\ \$ & \$ & \$ & \$ \end{bmatrix}.$$

At step 264, the locations and the values of the non-zero coefficients may be coded. In this regard, each of the coding modes described above may be associated with a different set of methods for coding locations of non-zero coefficients and their values. For the first and second coding modes described above, the locations of the non-zero AC coefficients may be conveyed by eight (8) bits. Although there were nine (9) possible locations for the AC coefficients, the last bit may be skipped, because whether the last bit is zero or not may be derived from the coding mode information. In addition, if all of the locations are the same for all of the components, a coding mode may be triggered that enables the location bits to be sent only once for the entire block 308, rather than for each component 310.

For the third and fourth coding modes, the locations of the non-zero coefficients may be conveyed using four (4) bits. Although there were five (5) possible locations for the AC coefficients, the last bit may be skipped because whether the last bit is zero or not may be derived from the coding mode information. Likewise, with respect to the fifth coding mode, only one (1) bit per sub-block 308 is required, while no bits are required for the sixth coding mode.

As described above, the maximum numbers of bits allocated to the locations and values of the coefficients are set to efficiently utilize the bits in units of bytes. In this regard, the locations and values of the coefficients in the first and second coding modes make a total of thirty-two (32) bits or four (4) bytes. The locations and values of the coefficients in the third and fourth coding modes make a total of twenty-four (24) bits or three (3) bytes. In addition, the locations and values of the coefficients in the fifth and sixth coding modes make a total of sixteen (16) bits or two (2) bytes.

At step 266, the locations of the non-zero coefficients may be sent. The magnitudes and signs of the coefficients may also be sent using a bit-allocation schedule predetermined for the selected coding mode at step 268. For the first coding mode shown with a maximum of three (3) non-zero AC coefficients, the bit allocation selected is seven (7) bits for the DC coefficient, and 6, 6, 5 for the three (3) non-zero AC coefficients in a zig-zag scan order of the AC coefficients. This bit allocation makes a total of twenty-four (24) bits. Thus, the locations and the values of the coefficients make a total of thirty-two (32) bits per component 310 per sub-block 308.

With reference to Transform Block A, the zig-zag scan order begins with the AC coefficient located to the immediate right of the DC coefficient and goes to the AC coefficient located to the immediate bottom of the DC coefficient. The zig-zag scan order then goes to the AC coefficient located below the AC coefficient located directly below the DC coefficient, then to the AC coefficient located to the right of the AC coefficient located directly below the DC coefficient, and so forth.

For the second coding mode, with a maximum of four (4) non-zero AC coefficients, the bit allocation selected is 6 for the DC coefficient, and 5, 5, 4, 4 for the four (4) non-zero AC coefficients in zig-zag scan order as described above. This bit allocation makes a total of twenty-four (24) bits. Thus, the locations and the values of the coefficients make a total of thirty-two (32) bits per component 310 per sub-block 308.

For the third coding mode, with a maximum of two (2) non-zero AC coefficients, the bit allocation selected is 7 for the DC coefficient, and 6, 6, for the two (2) non-zero AC coefficients in zig-zag scan order as described above. This bit allocation makes a total of nineteen (19) bits. In addition, for the fourth coding mode, with a maximum of three (3) non-zero AC coefficients, the bit allocation selected is 6 for the DC coefficient, and 5, 5, 4, for the three (3) non-zero AC coefficients in zig-zag scan order as described above. This bit allocation makes a total of twenty (20) bits. Thus, the locations and the values of the coefficients make a maximum of twenty-four (24) bits per component 310 per sub-block 308 in the third and fourth coding modes.

For the fifth coding mode, with a maximum of one (1) non-zero AC coefficient, the bit allocation selected is 7 for the DC coefficient, and 6 for the non-zero AC coefficient. This bit allocation makes a total of thirteen (13) bits. For the fifth coding mode, with a maximum of two (2) non-zero AC coefficients, the bit allocation selected is 6 for the DC coefficient, and 5, 5, for the two (2) non-zero AC coefficients in zig-zag scan order as described above. This bit allocation makes a total of sixteen (16) bits. Thus, the locations and the values of the coefficients make a maximum of 16 bits per component 310 per sub-block 308 in the fifth and sixth coding modes.

In addition to the coding information sent at steps 266 and 268, additional bits may be required to convey the quantization and coding modes and whether location information is used for all of the components 310. This information may, for instance, be conveyed as part of the header of the block 306.

Figure 4:
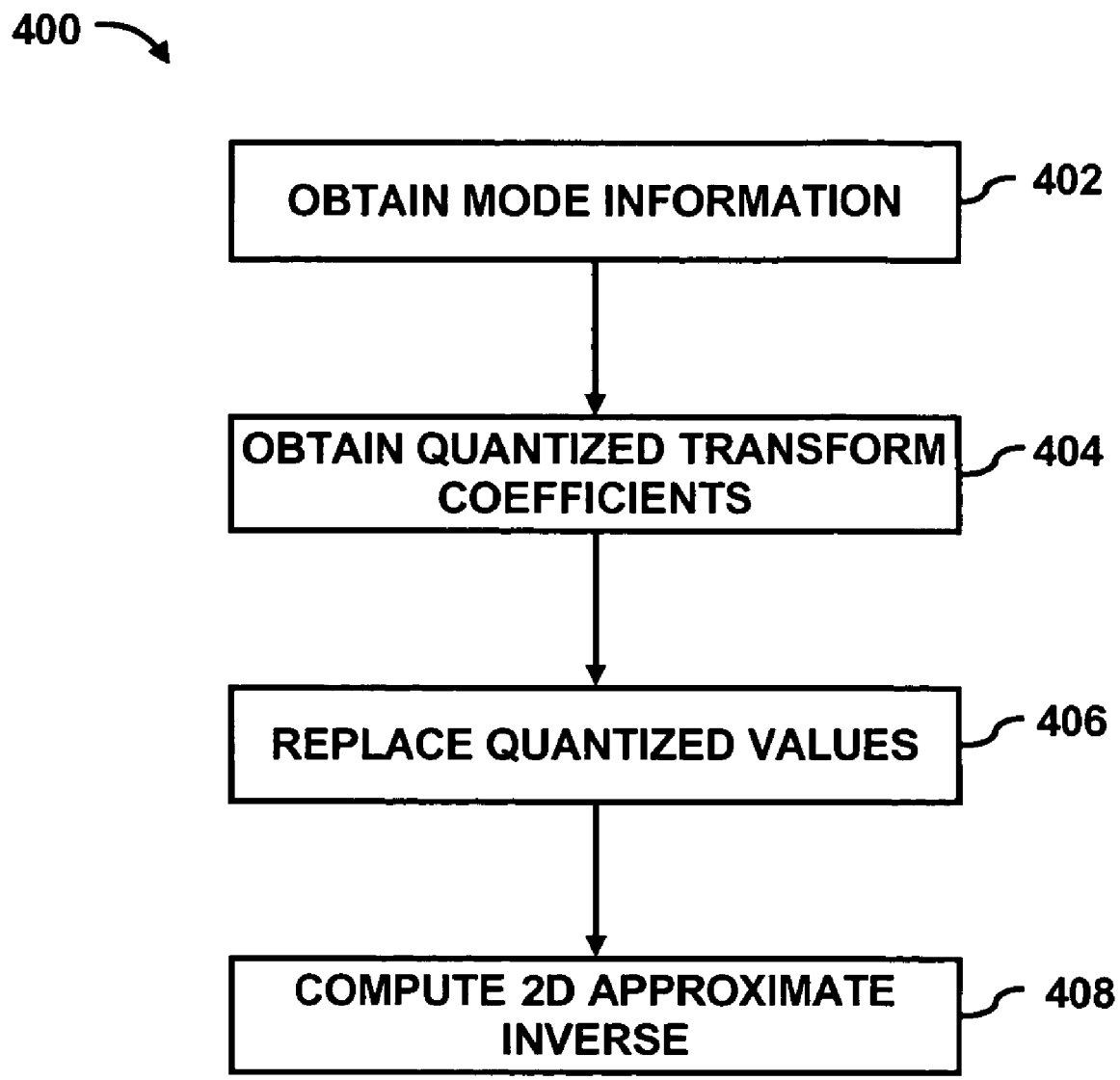
FIG. 4 depicts a flow diagram of a method for decompressing an image, according to an embodiment of the invention.

According to another example, FIG. 4 depicts a flow diagram of a method 400 for decompressing a compressed image. For instance, the method 400 may be employed to decompress an image that has been compressed through implementation of either of the methods 200 and 250 described above. In this regard, for instance, the method 400 may be initiated to decompress an image once the image is received.

As shown in FIG. 4, mode information for the compressed image may be obtained at step 402. The mode information may be obtained, for instance, from the header of the coding information. At step 404, quantized transform coefficients may be obtained by decoding the entropy code and the coefficient scans. The quantized values may be replaced by mid-points of the quantization bins based on the selected coding mode at step 406. In addition, the 2 dimensional approximate inverse transform of the quantized values may be computed by first computing the inverse column transforms and then the inverse row transforms, or vice versa, as indicated at step 408, to thereby decompress the compressed image.

Some or all of the operations illustrated in the methods 200, 250, and 400 may be contained as a utility, program, or a subprogram, in any desired computer accessible medium. In addition, the methods 200, 250, and 400 may be embodied by computer programs, which may exist in a variety of forms both active and inactive. For example, they may exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
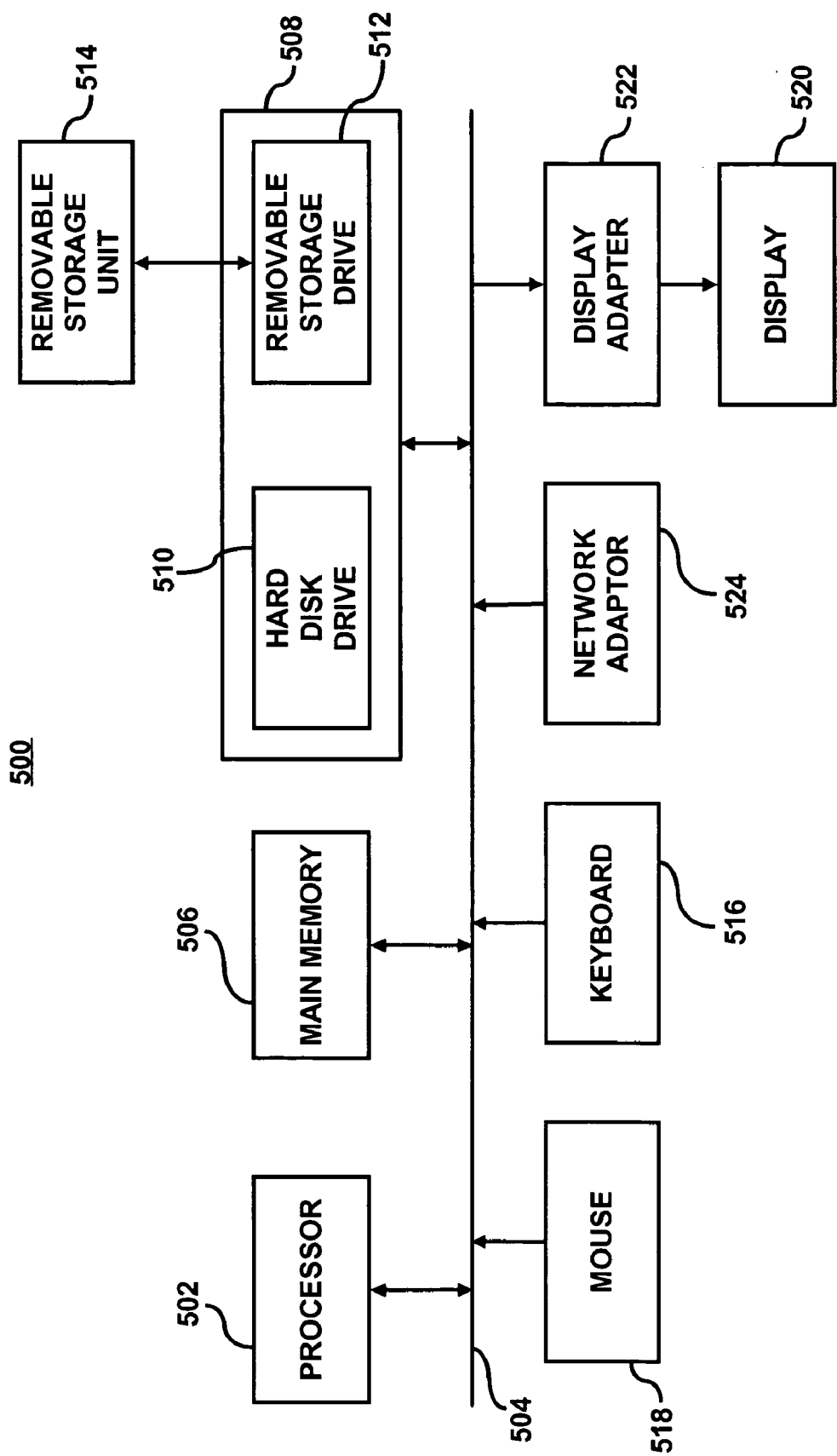
FIG. 5 illustrates a computer system, which may be employed to perform various functions described herein, according to an embodiment of the invention.

FIG. 5 illustrates a computer system 500, which may be employed to perform various functions described herein. The computer system 500 may include, for example, the controller 104. In this respect, the computer system 500 may be used as a platform for executing one or more of the functions described herein above with respect to the various components of the image compression system 102.

The computer system 500 includes one or more controllers and a processor 502. The processor 502 may be used to execute some or all of the steps described in the methods 200, 250 and 400. Commands and data from the processor 502 are communicated over a communication bus 504. The computer system 500 also includes a main memory 506, such as a random access memory (RAM), where the program code for, for instance, the controller 104, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the image compression system 102 may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, for instance, the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for compressing an image, said method comprising using a processor to carry out the steps of:
    determining a number of non-zero AC coefficients for a component transform and the locations of the non-zero AC coefficients in a transform block;
    selecting one of a plurality of coding modes in response to the number of non-zero AC coefficients and the locations of the non-zero AC coefficients satisfying predetermined criteria, wherein the plurality of coding modes comprise different bit allocations from each other; and
    coding locations and values of the non-zero AC coefficients and a DC coefficient for the component transform according to the selected coding mode, to thereby compress the image.

2. The method according to claim 1, wherein the step of determining a number of non-zero AC coefficients further comprises:
    dividing the image into a plurality of blocks;
    dividing each of the plurality of blocks into a plurality of sub-blocks containing components;
    computing transform blocks for each of the components, wherein the coefficients of a transform matrix are configured to enable implementation of the transform blocks with bit-shifts and additions; and
    quantizing the transform matrix coefficients for each of the plurality of coding modes with at least one quantization matrix.

3. The method according to claim 2, wherein the step of dividing the image into a plurality of blocks further comprises dividing the image into a plurality of 8×8 blocks and wherein the step of dividing each of the plurality of blocks into a plurality of sub-blocks further comprises dividing each of the plurality of blocks into a plurality of 4×4 sub-blocks.

4. The method according to claim 2, wherein the step of computing transform blocks for each of the components further comprises computing transform blocks for each of the components through use of the following transform matrix (T), $$T = \begin{bmatrix} 0.5 & 0.5 & 0.5 & 0.5 \\ 0.65625 & 0.265625 & -0.265625 & -0.65625 \\ 0.5 & -0.5 & -0.5 & 0.5 \\ 0.265625 & -0.65625 & 0.65625 & -0.265625 \end{bmatrix}.$$

5. The method according to claim 4, wherein the step of computing the inverse transform blocks for each of the components further comprises computing the inverse transform of the transform matrix (T) by scaling the second and fourth coefficients by $1/1.00244140625$, and by computing a transform using the transpose of the transform matrix (T).

6. The method according to claim 4, wherein the step of computing the inverse transform blocks for each of the components further comprises computing the approximate inverse transform of the transform matrix (T) by scaling the second and fourth coefficients by either of $1\tfrac{1}{512}$ or 1, and by computing a transform using the transpose of the transform matrix (T).

7. The method according to claim 2, wherein the step of quantizing the transform matrix coefficients further comprises quantizing the transform matrix coefficients for each of the plurality of coding modes with quantization matrices that include powers of two, such that, divisions of the quantization matrices are computable by bit-shifts.

8. The method according to claim 2, wherein the step of quantizing the transform matrix coefficients further comprises quantizing the transform matrix coefficients for each of the plurality of coding modes with at least one of the following quantization matrices $(Q_0, Q_1)$, $$Q_0 = \begin{bmatrix} 8 & 16 & 32 & 32 \\ 16 & 32 & 32 & 32 \\ 32 & 32 & 32 & 32 \\ 32 & 32 & 32 & 32 \end{bmatrix}, \text{ and}$$

$$Q_1 = 2 \times \begin{bmatrix} 8 & 16 & 32 & 32 \\ 16 & 32 & 32 & 32 \\ 32 & 32 & 32 & 32 \\ 32 & 32 & 32 & 32 \end{bmatrix}.$$

9. The method according to claim 8, wherein the step of selecting one of a plurality of coding modes further comprises:
    selecting a first coding mode for the transform blocks having no greater than three non-zero AC coefficients on quantization with the quantization matrix ($Q_0$) and where none of the non-zero AC coefficients are located in a lower right 6-coefficient triangle of the transform blocks; and
    selecting a second coding mode for the transform blocks having no greater than four non-zero AC coefficients on quantization with the quantization matrix ($Q_1$) and where none of the non-zero AC coefficients are located in the lower right 6-coefficient triangle of the transform blocks.

10. The method according to claim 9, wherein the step of selecting one of a plurality of coding modes further comprises:
    selecting a third coding mode for the transform blocks having no greater than two non-zero AC coefficients on quantization with the quantization matrix ($Q_0$) and where none of the non-zero AC coefficients are located in a lower right 10-coefficient triangle of the transform blocks; and
    selecting a fourth coding mode for the transform blocks having no greater than three non-zero AC coefficients on quantization with the quantization matrix ($Q_1$) and where none of the non-zero AC coefficients are located in the lower right 10-coefficient triangle of the transform blocks.

11. The method according to claim 10, wherein the step of selecting one of a plurality of coding modes further comprises:
    selecting a fifth coding mode for the transform blocks having no greater than one non-zero AC coefficients on quantization with the quantization matrix ($Q_0$) and where none of the non-zero AC coefficients are located in a lower right 13-coefficient triangle of the transform blocks; and selecting a fifth coding mode for the transform blocks having no greater than two non-zero AC coefficients on quantization with the quantization matrix ($Q_1$) and where none of the non-zero AC coefficients are located in the lower right 13-coefficient triangle of the transform blocks.

12. The method according to claim 11, wherein the step of coding locations and values further comprises coding locations of the non-zero AC coefficients and a DC coefficient in the first and second coding modes with eight bits, coding locations of the non-zero AC coefficients and a DC coefficient in the third and fourth coding modes with four bits, coding locations of the non-zero AC coefficients and a DC coefficient in the fifth coding mode with one bit, and coding locations of the non-zero AC coefficients and a DC coefficient in the sixth coding mode with no bits.

13. The method according to claim 12, further comprising:
allocating bits to the non-zero AC coefficients and the DC coefficient according to the selected coding mode, wherein the bit allocations are performed to substantially optimize the usage of bits in units of bytes.

14. The method according to claim 13, wherein the step of allocating bits further comprises:
for the first coding mode, allocating seven bits to the DC coefficient and six, six, and five bits for the three non-zero AC coefficients;
for the second coding mode, allocating six bits to the DC coefficient and five, five, four, and four bits for the four non-zero AC coefficients;
for the third coding mode, allocating seven bits to the DC coefficient and six and six bits for the three non-zero AC coefficients;
for the fourth coding mode, allocating six bits to the DC coefficient and five, five, and four bits for the three non-zero AC coefficients;
for the fifth coding mode, allocating seven bits to the DC coefficient and six bits for the one non-zero AC coefficient; and
for the sixth coding mode, allocating six bits to the DC coefficient and five and five bits for the two non-zero AC coefficients.

15. The method according to claim 14, wherein the step of allocating bits further comprises allocating bits according to a zig-zag scan order of the transform blocks.

16. The method according to claim 1, further comprising:
selecting at least one of a block truncation coding, a vector quantization coding, and a JPEG coding mode in response to the number of non-zero AC coefficients and the locations of the non-zero AC coefficients failing to satisfy the predetermined criteria; and
compressing the image using the selected at least one of the block truncation coding, the vector quantization coding, and the JPEG coding mode.

17. A method for decompressing a compressed image, said method comprising using a processor to carry out the steps of:
obtaining mode information, said mode information having entropy code and coefficient scans;
obtaining transform coefficients by decoding the entropy code and coefficient scans;
replacing quantized values by mid-points of quantization bins based upon the mode information; and
computing an approximate inverse transform of the quantized values to thereby decompress the compressed image.

18. A system for compressing an image, said system comprising:
a memory storing,
a module for dividing the image into components;
a module for computing transform blocks for each of the components with a transform matrix configured to enable implementation of the transform blocks with bit-shifts and additions;
a module for quantizing the transform matrix coefficients for a plurality of coding modes;
a module for selecting one of the plurality of coding modes based upon a number of non-zero AC coefficients and locations of the non-zero AC coefficients in the transform blocks; and
a module for encoding the non-zero AC coefficients and a DC coefficient in the transform blocks based upon the coding mode selected by the module for selecting; and
a controller for accessing the memory and controlling the modules, wherein the controller is configured to implement the modules to compress the image.

19. The system according to claim 18, wherein the module for computing transform blocks is configured to implement the following transform matrix (T) in computing the transform blocks, $$T = \begin{bmatrix} 0.5 & 0.5 & 0.5 & 0.5 \\ 0.65625 & 0.265625 & -0.265625 & -0.65625 \\ 0.5 & -0.5 & -0.5 & 0.5 \\ 0.265625 & -0.65625 & 0.65625 & -0.265625 \end{bmatrix}.$$

20. The system according to claim 19, wherein the module for computing inverse transform blocks is further configured to compute the inverse transform of the transform matrix (T) by scaling the second and fourth coefficients by $1/1.00244140625$, and by computing a transform using the transpose of the transform matrix (T).

21. The system according to claim 19, wherein the module for computing inverse transform blocks is further configured to compute the approximate inverse transform of the transform matrix (T) by scaling the second and fourth coefficients by either of $1\tfrac{1}{512}$ or 1, and by computing a transform using the transpose of the transform matrix (T).

22. The system according to claim 18, wherein the module for quantizing the transform matrix coefficients is configured to implement at least one of the following quantization matrices ($Q_0$, $Q_1$), $$Q_0 = \begin{bmatrix} 8 & 16 & 32 & 32 \\ 16 & 32 & 32 & 32 \\ 32 & 32 & 32 & 32 \\ 32 & 32 & 32 & 32 \end{bmatrix}, \text{ and}$$

$$Q_1 = 2 \times \begin{bmatrix} 8 & 16 & 32 & 32 \\ 16 & 32 & 32 & 32 \\ 32 & 32 & 32 & 32 \\ 32 & 32 & 32 & 32 \end{bmatrix}.$$

23. The system according to claim 18, wherein the module for selecting one of the plurality of coding modes is configured to select one of six coding modes, wherein each of the six coding modes have differing requirements for the number of coefficients and the locations of the coefficients.

24. The system according to claim 18, wherein the module for encoding the non-zero AC coefficients and a DC coefficient in the transform blocks based upon the coding mode is configured to allocate bits to the AC coefficients and the DC coefficient to substantially optimize the usage of bits in units of bytes.

25. The system according to claim 18, wherein the module for selecting is configured to select at least one of a block truncation coding, a vector quantization coding, and a JPEG coding mode if the number of non-zero AC coefficients and the locations of the non-zero AC coefficients fail to satisfy predetermined criteria, and wherein the module for encoding is configured to compress the image through use of the selected at least one of the block truncation coding, the vector quantization coding, and the JPEG coding mode.

26. The system according to claim 18, wherein the module for encoding is further configured to decompress a compressed image by decoding bit allocations to the DC and the AC coefficients according to the coding mode chosen by the module for selecting.

27. A system for compressing an image, said system comprising:

means for dividing the image in components;

means for transforming and quantizing the components to determine a number of non-zero AC coefficients and the locations of the non-zero AC coefficients;

means for selecting a coding mode based upon the number of non-zero AC coefficients and the locations of the non-zero AC coefficients;

means for encoding the components according to the coding mode selected by the means for selecting to thereby compress the image.

28. A computer readable storage medium on which is embedded one or more computer programs, said one or more computer programs implementing a method for compressing an image, said one or more computer programs comprising a set of instructions for:

dividing the image into a plurality of blocks;

dividing each of the plurality of blocks into a plurality of sub-blocks containing components;

computing transform blocks for each of the components, wherein the coefficients of a transform matrix are configured to enable implementation of the transform blocks with bit-shifts and additions;

quantizing the transform matrix coefficients for each of a plurality of coding modes with at least one quantization matrix;

selecting one of the plurality of coding modes in response to a number of non-zero AC coefficients and locations of the non-zero AC coefficients in the transform blocks satisfying predetermined criteria, wherein the plurality of coding modes comprise different bit allocations from each other; and coding locations and values of the non-zero AC coefficients and a DC coefficient for the component transform according to the selected coding mode, to thereby compress the image.

29. A method for compressing and decompressing an image, said method comprising using one or more processors to carry out the steps of:

compressing the image by, determining a number of non-zero AC coefficients for a component transform and the locations of the non-zero AC coefficients in a transform block;

selecting one of a plurality of coding modes in response to the number of non-zero AC coefficients and the locations of the non-zero AC coefficients satisfying predetermined criteria, wherein the plurality of coding modes comprise different bit allocations from each other;

coding locations and values of the non-zero AC coefficients and a DC coefficient for the component transform according to the selected coding mode, to thereby compress the image; and decompressing the compressed image by decoding bit allocations to the DC and the AC coefficients according to the coding mode chosen by the module for selecting.

30. The method according to claim 29, wherein decompressing the compressed image further comprises using one or more processors to carry out the steps of:

obtaining mode information, said mode information having entropy code and coefficient scans;

obtaining transform coefficients by decoding the entropy code and coefficient scans, replacing quantized values by mid-points of quantization bins based upon the mode information; and computing an approximate inverse transform of the quantized values to thereby decompress the compressed image.

* * * * *

UNITED STATES PATENT AND TRADEMARK OFFICE
CERTIFICATE OF CORRECTION

PATENT NO. : 7,620,252 B2 Page 1 of 1
APPLICATION NO. : 11/113250
DATED : November 17, 2009
INVENTOR(S) : Debargha Mukherjee It is certified that error appears in the above-identified patent and that said Letters Patent is hereby corrected as shown below:

In column 6, line 45, delete "$1^{1}/_{512}$" and insert -- 1-1/512 --, therefor.

In column 12, line 1, in Claim 6, delete "$1^{1}/_{512}$" and insert -- 1-1/512 --, therefor.

In column 14, line 44, in Claim 21, delete "$1^{1}/_{512}$" and insert -- 1-1/512 --, therefor.

Signed and Sealed this

Sixteenth Day of March, 2010

David J. Kappos
*Director of the United States Patent and Trademark Office*